(12) United States Patent
Kim et al.

(10) Patent No.: US 7,270,576 B2
(45) Date of Patent: Sep. 18, 2007

(54) MODULAR BATTERY WITH CONNECTOR INTERCONNECTING TERMINALS OF ADJACENT UNIT CELLS

(75) Inventors: Tae-Yong Kim, Yongin-si (KR); Yoon-Cheol Jeon, Yongin-si (KR); Gun-Goo Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/493,983

(22) Filed: Jul. 27, 2006

(65) Prior Publication Data

US 2007/0026739 A1   Feb. 1, 2007

(30) Foreign Application Priority Data

Jul. 29, 2005   (KR) ................ 10-2005-0069483

(51) Int. Cl.
*H01R 24/00* (2006.01)
(52) U.S. Cl. .................... 439/627; 429/158
(58) Field of Classification Search ........... 439/627, 439/510, 500; 429/158
See application file for complete search history.

(56) References Cited

U.S. PATENT DOCUMENTS

| | | | | | |
|---|---|---|---|---|---|
| 452,303 | A | * | 5/1891 | Hanson ............... | 429/158 |
| 4,581,306 | A | * | 4/1986 | Hasenauer et al. ...... | 429/123 |
| 5,662,497 | A | * | 9/1997 | Reilly ................ | 439/627 |
| 6,186,831 | B1 | * | 2/2001 | Tsai .................. | 439/627 |
| 6,709,786 | B2 | * | 3/2004 | Asaka et al. .......... | 429/158 |
| 2002/0177036 | A1 | | 11/2002 | Faris | |

FOREIGN PATENT DOCUMENTS

| | | |
|---|---|---|
| GB | 1338233 A | 11/1973 |
| GB | 2299701 A | 10/1996 |
| WO | 98/31059 A | 7/1998 |

OTHER PUBLICATIONS

A search report dated Dec. 22, 2006 from corresponding European Application No. 06118027.9 in 6 pages.

* cited by examiner

*Primary Examiner*—Tho D. Ta
(74) *Attorney, Agent, or Firm*—Knobbe Martens Olson & Bear LLP (57) ABSTRACT

The present invention provides a battery module including a plurality of a unit cell having a terminal and a connection member, whose both ends are respectively fastened to the terminals of at least a pair of adjacent unit cells and has a joint in the middle. The connection member is improved to easily correspond to distance discrepancies between unit cells having a terminal, as both ends of the two rods can swing centering the joint.

22 Claims, 6 Drawing Sheets

MODULAR BATTERY WITH CONNECTOR INTERCONNECTING TERMINALS OF ADJACENT UNIT CELLS

CROSS-REFERENCE TO RELATED APPLICATION

This application claims priority to Korean patent application No. 10-2005-0069483 filed in the Korean Intellectual Property Office on Jul. 29, 2005, and all the benefits accruing therefrom under 35 U.S.C. §119. The contents of the Korean patent application are incorporated herein by reference in their entirety.

BACKGROUND OF THE INVENTION

1. Field of the Invention

The present invention relates to a modular battery. More particularly, the present invention relates to a high power and large capacity battery module having an improved connection member between unit cells.

2. Description of the Related Art

A rechargeable or secondary battery is generally distinguished from a primary battery in that it can be repeatedly charged when discharged. A rechargeable battery with low capacity is used for small portable electronic devices such as mobile phones, laptop computers, and camcorders. On the other hand, a rechargeable battery with high capacity can be used as a power source for driving a motor of a hybrid electric automobile and the like. A plurality of low capacity rechargeable batteries may be connected in series to form a battery module with high capacity so that it may be used for driving a motor of an electric vehicle requiring a large amount of electric power.

The battery module or modular battery generally includes a plurality of rechargeable batteries, which are often referred to as unit cells (hereinafter "unit cells" for convenience). The unit cells respectively include an electrode assembly, which is composed of positive and negative electrodes and a separator interposed therebetween, a case having a space for housing the electrode assembly, a cap assembly combined with the case and sealing it, and positive and negative terminals that are electrically coupled to respective positive and negative electrodes.

The rechargeable batteries or unit cells are mainly formed in a cylindrical or prismatic shape. In the prismatic configurations, the positive and negative terminals typically externally protrude out of the cap assembly, so that it can be exposed to outside the unit cell.

When the unit cells forms a battery module, they are arranged such that the positive terminal of one unit cell is close to the negative terminal of a neighboring unit cell. Then, the positive and negative terminals are connected each other through a connection member (conductor). The connection member may be fastened to positive and negative terminals by nuts or other mechanisms. The positive and negative terminals may have threads like a bolt so as to be coupled with nuts.

Typically, the connection member is formed in a single piece with two engagement portions or means apart from each other at a distance. One engagement portion or means is to be engaged with the positive terminal of one unit cell, and the other is to be engaged with the negative terminal of an immediately neighboring unit cell. The engagement portions or means may be a hole through which an externally protruding terminal can be inserted. When the terminals are threaded, nuts may be used to secure the connection member to the terminals.

When the distance between two neighboring unit cells is not exact and therefore the distance between the two terminals to be connected with a connection member, connecting the connection members with terminals of unit cells may become difficult. Given the configuration of the connection members, the distance between two neighboring unit cells should be precisely controlled. When the design of the parts of the unit cells is changed and the distance changes, the difficulty can realize. Thus, there is a need to improve the design of the connection member that can accommodate the changes in the distance.

The above information in this background section is only for the understanding of the background of the invention, and no statement in this section constitutes an admission of prior art.

SUMMARY OF CERTAIN INVENTIVE ASPECTS

One aspect of the invention provides a modular battery. The modular battery comprises: a plurality of unit cells comprising a first unit cell and a second unit cell, the first unit cell comprising a first terminal, the second unit cell comprising a second terminal; and a terminal connector comprising a first member and a second member, the first member being configured to be fastened to the first terminal, the second member being configured to be fastened to the second terminal, wherein the first and second member are mechanically connected with each other while being configured to rotate relative to each other about an axis.

In the foregoing battery, the terminal connector may be further configured to electrically connect the first and second terminals. The terminal connector may further comprise a third member rotatably interconnecting the first and second members. The terminal connector may further comprise means for interconnecting the first and second members and for allowing relative rotation between the first and second members about the axis. The first and second unit cells may be neighboring with each other without another unit cell placed therebetween. The first member may comprise a terminal portion engaging with the first terminal and a coupling portion engaging with the second member. The first member may be elongated with two opposing ends, and wherein the terminal portion may be located near one end, and the coupling portion may be located near the other end. The coupling portion of the first member may comprise a coupling hole, wherein the terminal connector may further comprise a coupling member inserted into the coupling hole and engaging with the second member. The axis may pass through the coupling hole.

Still in the foregoing battery, wherein the second member may comprise a terminal portion engaging with the second terminal and a coupling hole, and wherein the coupling member may be further inserted into the coupling hole of the second member. The coupling member inserted through the coupling holes of the first and second member may be configured to act as a shaft for the relative rotation. The coupling member may be a rivet. The coupling member may be welded to the at least one of the first and second members. The first and second member hardly rotates about the axis when fastened to the first and second terminal respectively. The battery may further comprise a plurality of additional terminal connectors, wherein each of the additional terminal connectors mechanically interconnects a terminal belonging to one of the plurality of unit cells and a terminal belonging to a another unit cell neighboring the one unit cell in the same manner as the terminal connector. The unit cell may be in a prismatic configuration. The battery may further comprise a separator located between the first and second unit cells.

Another aspect of the invention provides a method of making a modular battery. The method comprises: providing a plurality of unit cells comprising a first unit cell and a second unit cell, the first unit cell comprising a first terminal, the second unit cell comprising a second terminal; providing a terminal connector comprising a first member and a second member, wherein the first and second member are mechanically connected with each other while being configured to rotate relative to each other about an axis; and interconnecting the first and second terminals using the terminal connector.

In the foregoing method, interconnecting may comprise fastening the first member to the first terminal and fastening the second member to the second terminal, wherein interconnecting may further comprise rotating the first member relative to the second member about the axis. Interconnecting may comprise electrically connecting the first and second terminals. The terminal connector may further comprise means for interconnecting the first and second members and for allowing relative rotation between the first and second members. The first and second unit cells may be neighboring with each other without another unit cell placed therebetween.

One aspect of the present invention provides a battery module that can easily accommodate a distance discrepancy between unit cells. In addition, another aspect of the present invention provides a battery module having a uniform current flow.

One embodiment provides a battery module including a plurality of a unit cell with terminals and a connection member, both ends of which are fastened with terminals of at least a pair of adjacent unit cells and has a joint in the middle of the both ends. Accordingly, the battery module has characteristics that both ends of the connection member can swing centering the joint as a shaft. The unit cell may be a prismatic or cylindrical rechargeable battery. On the other hand, the connection member may include at least two rods and a coupling unit joining the two rods at the joint. The two rods are structured to swing centering the coupling unit. The two rods may include a through-hole at each end, through which terminals of a unit cell can be inserted.

The connection member may have a structure that two rods are overlapped and contact each other. The contacting area of the two rods may have a stair structure. In addition, the two rods may have a structure that each end with a through-hole is protruded in an opposing direction. The coupling unit may include a shaft member protruded on one side of the first rod and having a coupling hole and a coupling pin inserted into the coupling hole on the shaft member, which is inserted through another hole on the second rod, through which the shaft member is inserted out of the second rod. The coupling unit may include a rivet inserted into a through-hole on the contact area of the two rods to join them. The coupling unit may include a bolt inserted into a through-hole on the contact area on the two rods and a nut corresponding to the bolt. The coupling unit may be welded to the two rods, which decreases a contacting resistance between the coupling unit and rods.

According to another embodiment of the present invention, a battery module may further include a cell barrier for maintaining a distance between unit cells and circulating a coolant therethrough. The battery module may be used as a power source for motor-driven devices such as hybrid electric automobiles (HEV), electric vehicles (EV), cordless cleaners, motorbikes, electric scooters, and so on.

DETAILED DESCRIPTION OF CERTAIN INVENTIVE EMBODIMENTS

Various embodiments of the present invention now will be described more fully hereinafter with reference to the accompanying drawings. The embodiments can be modified in various ways while maintaining the concepts of the invention, and are not limited to those illustrated herein. In the following description, the same reference numerals denote the same or functionally similar elements.

A unit cell to be used in a modular battery can be fabricated as a various shape, for example, a prism, a cylinder, and so on. For example, a prismatic unit cell is illustrated in the following embodiments.

Figure 1:
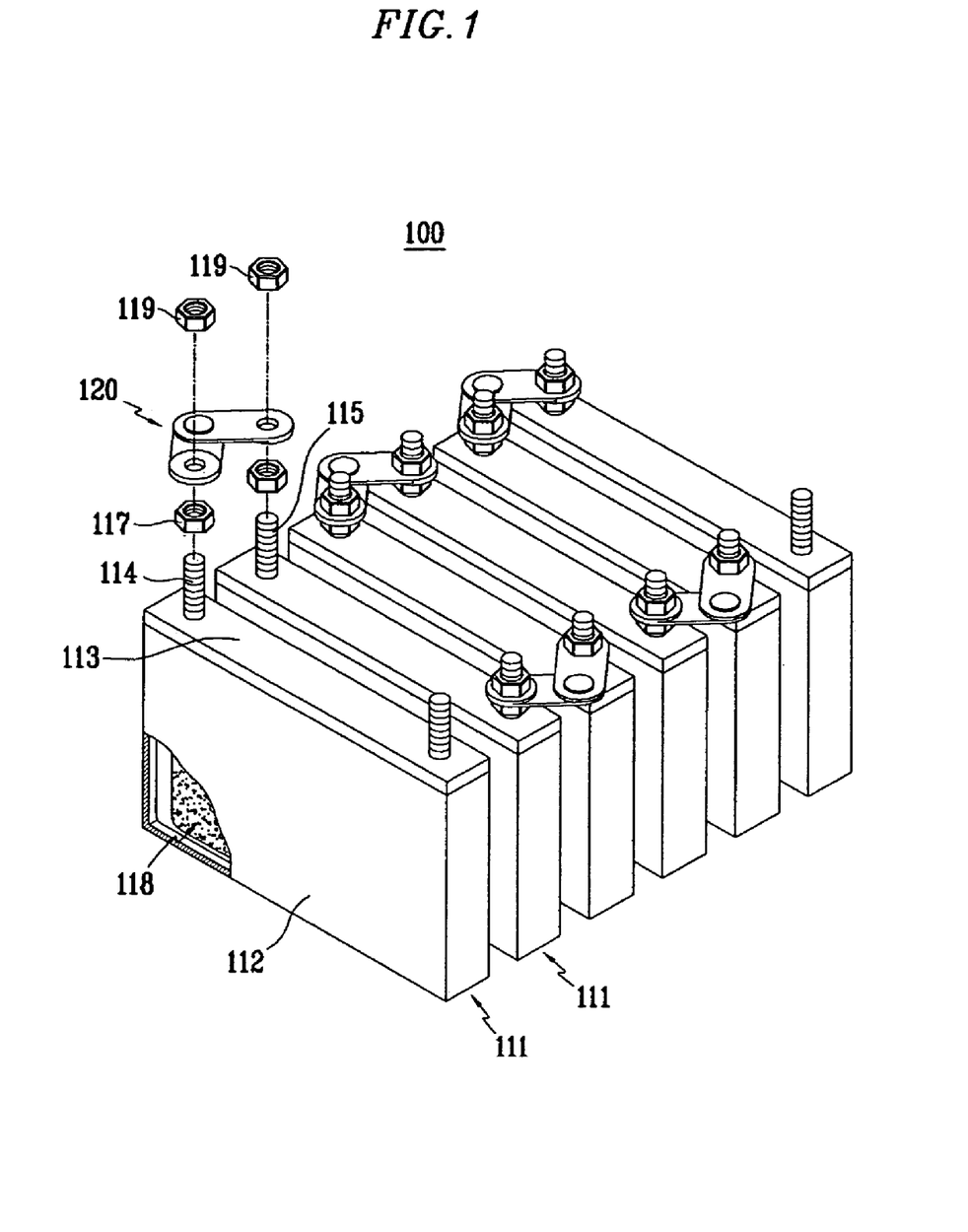
FIG. 1 is an exploded perspective view showing a battery module according to one embodiment of the present invention.

FIG. 1 is an exploded perspective view of a battery module 100 according to one embodiment of the present invention. The battery module 100 includes a plurality of a unit cell 111 that is consecutively arranged with a predetermined interval and can be a large capacity battery. Each unit cell 111 includes an electrode assembly 118, a case 112, a cap assembly 113, and positive and negative terminals 114 and 115. The electrode assembly 118 includes a positive electrode, a negative electrode and a separator interposed therebetween. The case 112 has an internal space for housing the electrode assembly. The cap assembly 113 is mounted on and closes an open side of the case 112. The positive and negative terminals 114, 115 are respectively connected to the positive and negative electrodes of the electrode assembly 118.

In embodiments, the case 112 is fabricated of a conductive metal such as aluminum, an aluminum alloy, or nickel-plated steel. In embodiments, the case 112 is shaped to have the internal space as a hexagonal prism or other shapes.

According to the illustrated embodiment, each unit cell 111 has a structure of having positive and negative terminals 114 and 115 externally extending out of the cap assembly 113. The two terminals 114 and 115 are threaded on the external circumferential surface. In other embodiments, the terminals 114 and 115 can have other shapes and configurations. In the illustrated embodiment, the terminals 114 and 115 of each unit cell 111 fixed to the cap assembly 113 with the nuts 117 fastened with the terminals 114 and 115.

A plurality of unit cells 111 are arranged to form a battery module 100 with large capacity. In the illustrated embodiment, the terminals 114, 115 form two linear rows with an interval between the neighboring ones. In each linear row, positive and negative terminals 114 and 115 are alternatingly arranged such that the two neighboring terminals have one positive terminal and one negative terminal.

The battery module 100 further includes a connection member 120 connecting the positive and negative terminals 114 and 115 in two adjacent unit cells 111 in order to connect them in series. The connection member 120 includes a joint between its two ends. The two ends of the connection member 120 can rotate centering a joint as a shaft. In the illustrated embodiment, the connection member 120 is placed on the nut 117 and fixed thereon by fastening the nut 119 with the terminals 114 and 115.

Figure 2:
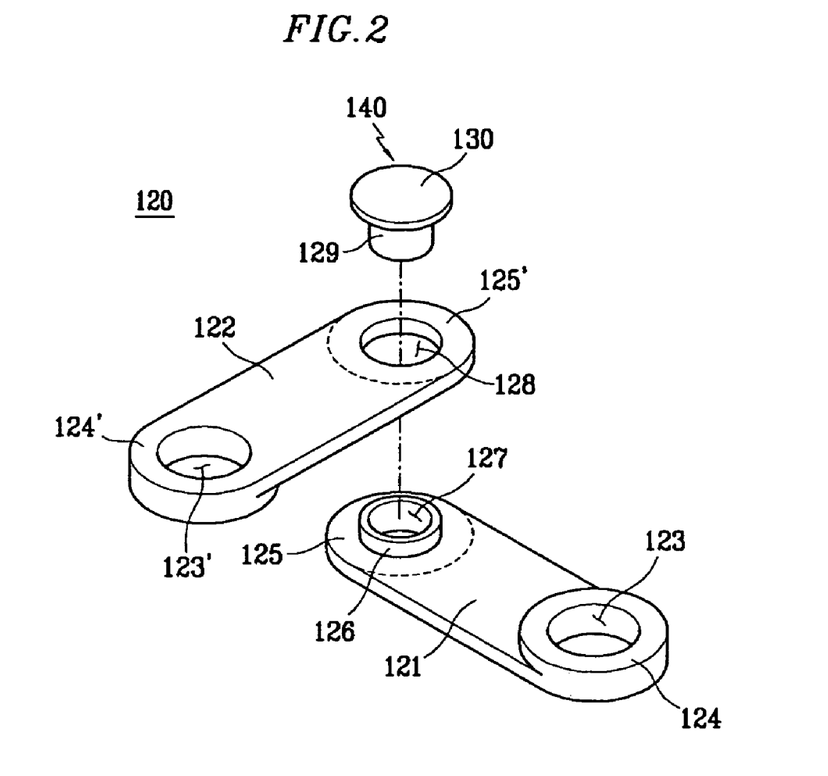
FIG. 2 is an exploded perspective view showing a connection member illustrated in FIG. 1.
Figure 3:
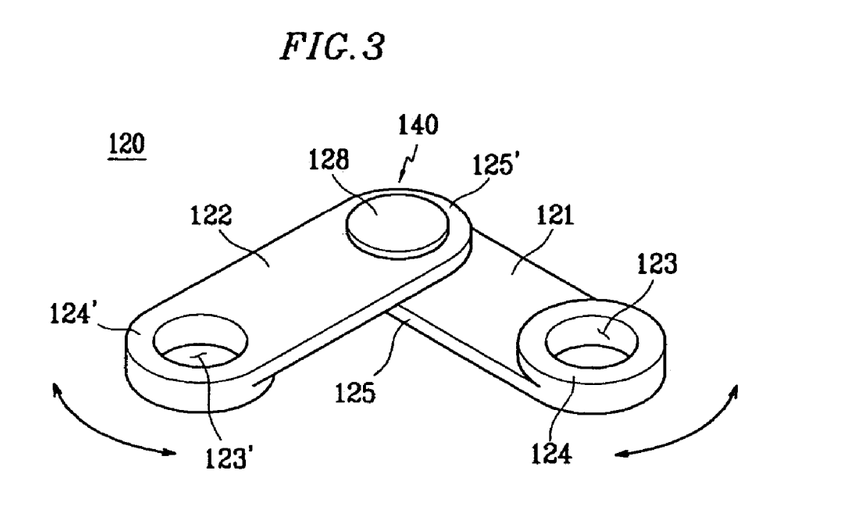
FIG. 3 is a perspective view showing the connection member illustrated in FIG. 2.
Figure 4:
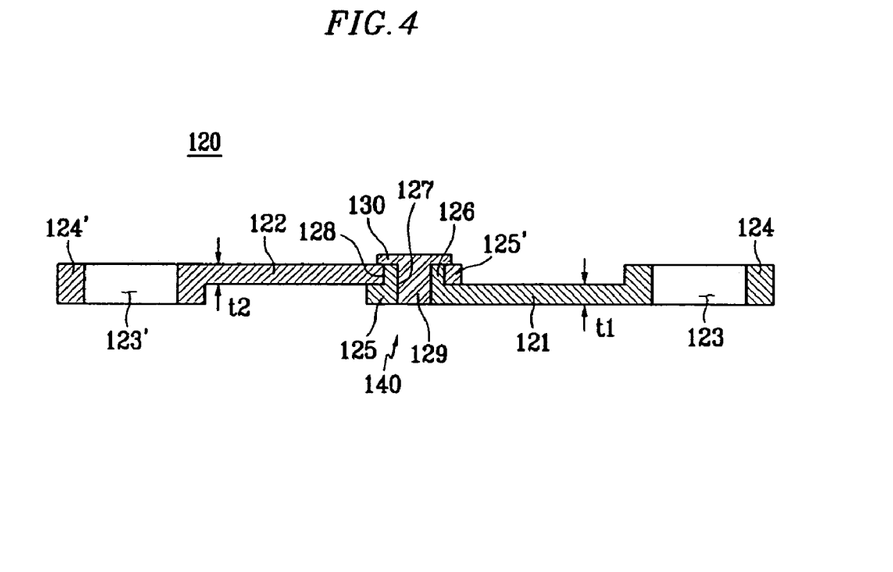
FIG. 4 is a cross sectional view of FIG. 3.

FIG. 2 is an exploded perspective view of the connection member 120 illustrated in FIG. 1. FIG. 3 is a perspective view of the connection member 120 illustrated in FIG. 2. FIG. 4 is a cross sectional view of the connection member 120 illustrated in FIG. 3. Referring to the drawings, the connection member 120 has a plate structure and includes a first rod 121, a second rod 122, and a coupling unit 140.

The first rod 121 includes a through-hole 123 at one end, through which positive (or negative) terminal 114 or 115 can be inserted. The second rod 122 has a shape corresponding to the first rod 121. In other words, one end of 124' of the second rod include a through-hole 123', through which a negative terminal 115 (or a positive terminal 114) can be inserted, and the other end is joined with the other end of the first rod 121.

The coupling unit 140 is formed on a joint 125 and 125' of the first and second rod 121 and 122. The coupling unit 140 connects the first and second rods 121, 122 such that the first and second rod 121 and 122 can swing back and forth or rotate about an axis passing through the coupling unit 140.

As aforementioned, two rods 121 and 122 along with the coupling unit 140 form a connection member 120. Each rod 121, 122 includes through-holes 123 and 123' at one end 124 and 124' and a joint 125 and 125' at the other end. The first and second rods 121 and 122 overlap each other to make surface contact at the joint 125 and 125'. The first and second rods 121 and 122 may be formed to have the same size. One end 124 and 124' of the first and second rods 121 and 122 in the connection member 120 has a stepped portion in the cross section. As illustrated in FIG. 4, the stepped portions of the first and second rods 121, 122 at their ends 124, 124' are stepped in opposing directions. The end 124 and 124' of the first and second rods 121 and 122 has the same height. The first rod 121 has the same thickness ($t_1$, refer to FIG. 4) as that of the second rod 122 ($t_2$, refer to FIG. 4). The thicknesses of the stepped portion in the first rod 121 is $t_2$. The thickness of the stepped portion of the second rod 122 is $t_2$. Accordingly, when the first and second rods are joined, each end 124 and 124' of the first and second rods can be disposed on the same plane.

The coupling mechanism or unit 140 includes a stepped shaft member 126 of the first rod 121 and a coupling hole 127 formed in the center of the shaft member 126. The coupling mechanism 140 further includes a hole 128 formed in the second rod 122 to receive the stepped shaft member 126. The coupling mechanism 140 further includes a coupling pin 129 inserted through the coupling hole 127. The coupling unit 140 plays a role of a shaft through which the first and second rods 121 and 122 can relatively rotate as well as join the first and second rods 121 and 122.

The coupling pin 129 includes a head or flange 130. The diameter of the head 130 is larger than the hole 128 to prevent the second rod 122 from being slipped away from the shaft member 126. The coupling pin 129 may be welded to the second rod 122 after being inserted into the coupling hole 127. The welding process may be performed using laser or TIG. Thereby, a contact resistance between the coupling pin 129 and second rod 122 may be reduced.

As illustrated, the two joints 125 and 125' of the first and second rods 121 and 122 are closely adjacent to each other to form a single connection member 120, through which a current flow. Furthermore, the joints 125 and 125' of the first and second rods 121, 122 are joined to rotate relative to each other about centering the coupling pin 129 and the shaft member 126 as a shaft. Since the two rods 121 and 122 can rotate relative to each other, through-holes 123 and 123' at each end 124 and 124' of the two rods 121 and 122 can have an adjustable distance therebetween corresponding to that of terminals 114 and 115 of two adjacent unit cells 111.

For example, when a distance between two adjacent unit cells 111 is smaller than the originally predetermined distance between through-holes 123 and 123' at both ends 124 and 24' of a connection member 120, the hole 123 and 123' of the first and second rods 121 and 122 can also have a decreased distance, as the first and second rods 121 and 122 rotate centering the coupling unit 140. This rotational adjustment of the rods can be performed either manually or automatically using automated equipment. Accordingly, the distance between the through-holes 123 and 123' of a connection member 120 can be adjusted in view of the distance between terminals 114 and 115 of two adjacent unit cells 111.

Even when the distance between terminals 114 and 115 of two adjacent unit cells 111 is larger the originally predetermined distance of the through-holes 123 and 123' of the connection member 120, the hole 123 of the first rod 121 and the hole 123' of the second rod 122 can have an adjusted distance corresponding to that of the terminals by swing or relatively rotating the first and second rods 121 and 122 in a direction opposing to the above.

Figure 6:
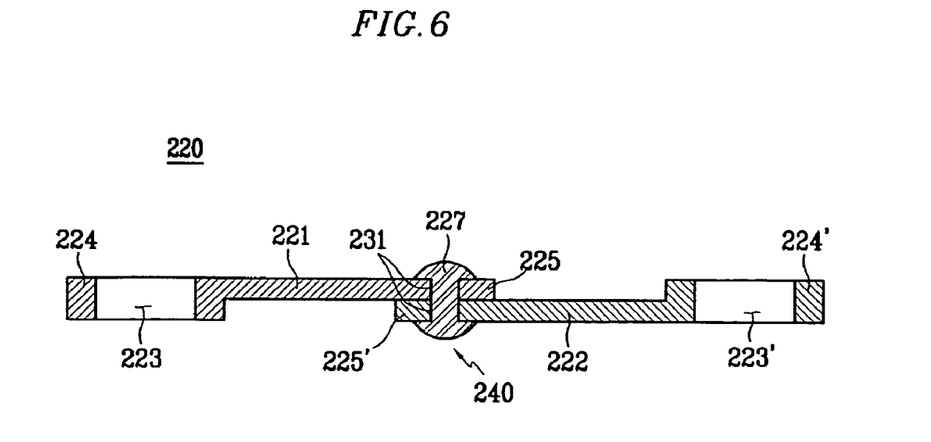
FIG. 6 is a cross sectional view of a connection member according to another embodiment.

FIG. 6 shows a cross sectional view of a connection member 220 according to another embodiment of the present invention. Referring to the drawing, a coupling mechanism or unit 240 includes a hole 231 at each joint 225 and 225' of first and second rods 221 and 222 and a rivet 227 fastening the first and second rods 221 and 222 through the hole 231. The rivet 227 may be welded to the two rods 221 and 222 to reduce the contact resistance formed between the rivet and the rods.

Figure 7:
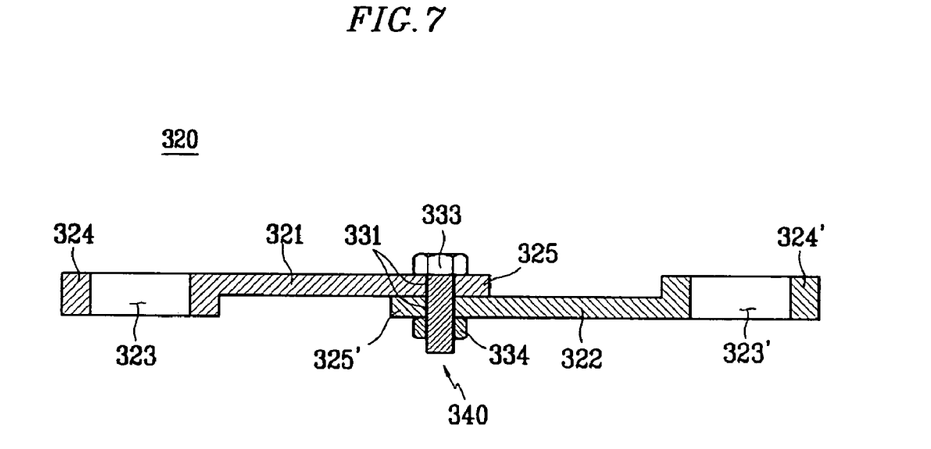
FIG. 7 is a cross sectional view of a connection member according to another embodiment of the present invention.

FIG. 7 is a cross sectional view of a connection member 320 according to another embodiment of the present invention. Referring to the drawing, first and second rods 321 and 322 are structured to swing or rotating relative to each other by a bolt 333 and a nut 334 fastened through a hole 331 at each joint 325 and 325' of the first and second rods 321 and 322. The bolt 333 and nut 334 may be welded to the two rods 321 and 322 to reduce the contact resistance therein. The structure and operation not mentioned in these embodiments are the same as discussed above in connection with the first embodiment.

Figure 8:
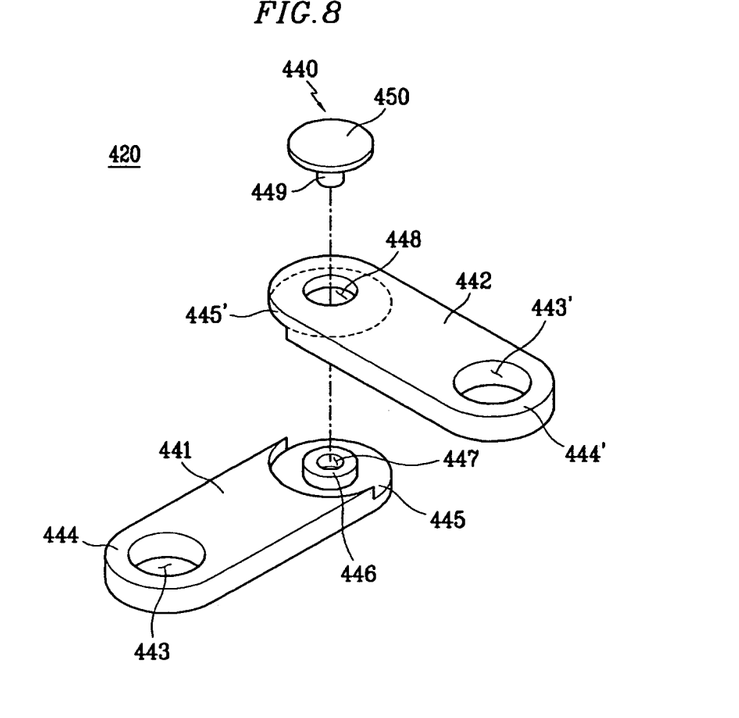
FIG. 8 is an exploded perspective view of a connection member according to still another embodiment of the present invention.
Figure 9:
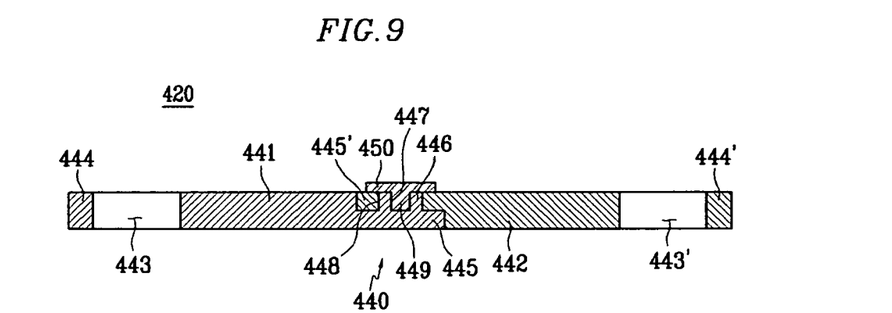
FIG. 9 is a cross sectional view of the connection member illustrated in FIG. 8.

FIG. 8 is an exploded perspective view of a connection member 420 according to another embodiment of the present invention. FIG. 9 is a connection cross sectional view of the connection member 420 illustrated in FIG. 8. Referring to the drawings, the connection member 420 is a plane plate structure including first and second rods 441 and 442 and a coupling mechanism or unit 440.

The first rod 441 includes a through-hole 443 at end, through which a positive or negative terminal 114 or 115 (refer to FIG. 1) can be inserted. The second rod 442 has a shape corresponding to the first rod 441. In other words, the second rod 442 includes a through-hole 443' at one end 444', through which negative or positive terminal 114 or 115 can be inserted. The other end of the second rod 442 is joined with the other end of the first rod 441.

The coupling mechanism or unit 440 is formed at joints 445 and 445' of the first and second rods 441 and 442, so that the first and second rods 441 and 442 can swing rotate relative to each other centering the coupling unit 440. The joints 445 and 445' of the first and second rods 441 and 442 are formed as a step to oppose each other, so that each end 444 and 444' of the first and second rods 441 and 442 has the same height when the two rods 441 and 442 are joined together.

In other words, the joints 445 and 445' of the first and second rods 441 and 442 are formed as a step to have a half thickness of the first and second rods 441 and 442. Accordingly, even if the first and second rods 441 and 442 are joined together, the other ends 444 and 444' of the two rods 441 and 442 can be laid on the same plane.

The coupling unit 440 includes a shaft member 446 vertically protruded from a junction face of a joint 445 and having a coupling hole 447 in the middle and a coupling pin 449 inserted into the coupling hole 447 in the center of the shaft member 446 of the first rod 441 and another hole 448 in the second rod 442, through which the shaft member is inserted to fix the second rod 442. The coupling unit 440 plays a role of a spinning shaft around which the first and second 441 and 442 can respectively rotate relative to each other as well as join the first and second rods 441 and 441.

The coupling pin 449 includes a head or flange 450 formed larger than the hole 448 in order to prevent the second rod 442 from being slipped away from the shaft member 449. The coupling pin 449 may be welded to the second rod 442 after being inserted the coupling hole 447. The welding process may be performed using laser or TIG. The welding may reduce the contact resistance between the coupling pin 449 and second rod 442. In this way, two joints 445 and 445' of the first and second rods 441 and 442 are closely adjacent to each other to form one connection member 420 through which a current flow.

Furthermore, each joint 445 and 445' of the first and second rods 441 and 442 is joined to swing or rotate relative to each other around the coupling unit 440 as a shaft. Since the two rods 441 and 442 can swing each other, the distance between the holes 443 and 443' at each end 444 and 444' of the two rods 441 and 442 can be adjusted to correspond to the distance between terminal 114 and 115 of two adjacent unit cells 111.

Figure 10:
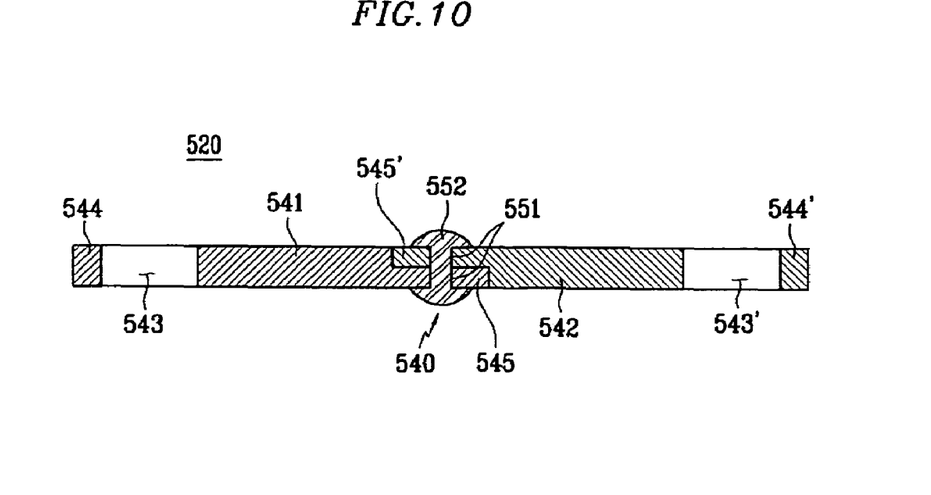
FIG. 10 is a cross sectional view of a connection member according to a further embodiment of the present invention.

FIG. 10 shows a cross sectional view of a connection member 520 according to a further embodiment of the present invention. Referring to the drawing, a coupling mechanism or unit 540 includes a hole 551 at joints 545 and 545' of first and second rods 541 and 542 and a rivet 552 joining the two rods 541 and 542 through the hole 551.

Figure 11:
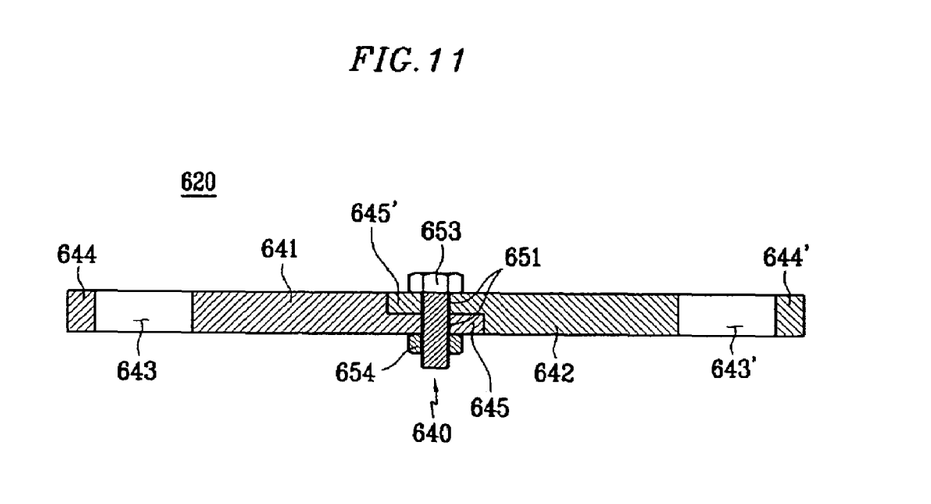
FIG. 11 is a cross sectional view of a connection member according to a still further embodiment of the present invention.

FIG. 11 is a cross sectional view of a connection member 620 according to an additional embodiment of the present invention. Referring to this drawing, the first and second rods 641 and 642 are structured to rotate or swing relative to each other by a bolt 653 and a nut 654 fastened through a hole 651 formed at joints 645 and 645'. The rest of structures and operation not mentioned here are the same as those of the first embodiment.

Figure 5:
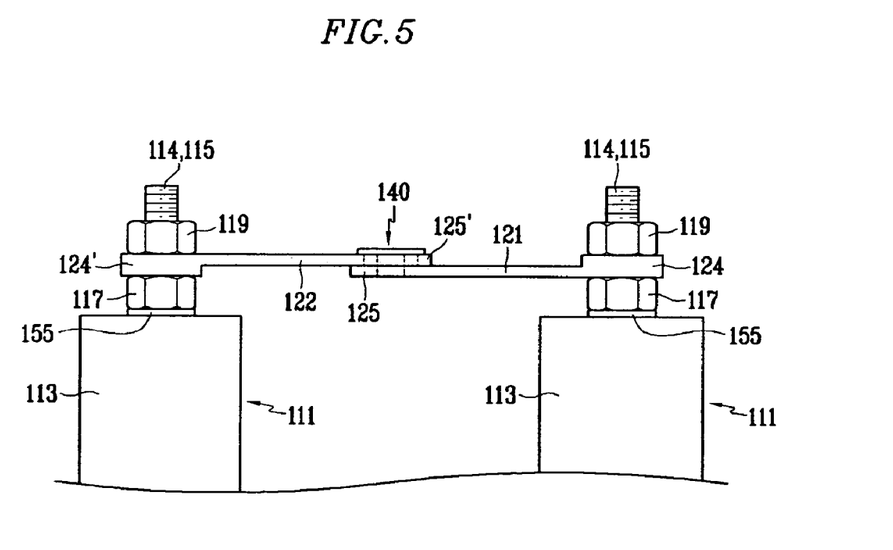
FIG. 5 is a side view of the connection member that is fastened to two neighboring terminals.

Hereinafter, operation of a battery module is illustrated with a reference to the embodiment illustrated in FIG. 5. Fist of all, positive and negative terminals 114 and 115 are mounted to be protruded out of a cap assembly 113 of each unit cell 111. A washer 155 is mounted on the terminals 114 and 115, and the nut 117 is fastened on the washer 155, and thereby, the terminals 114 and 115 are fixed on a cap assembly 113.

When the battery module with high power output is formed by connecting each unit cell 111, the connection members 120 are mounted with terminals 114 and 115 of each unit cell 111 through through-holes 123 and 123' at each end 124 and 124' of the first and second rods 121 and 122. Herein, each unit cell 111 is arranged with a predetermined interval, in which positive and negative terminals 114 and 115 of each unit cell 111 are alternatively repeated. Then, the terminals 114 and 115 are inserted through through-holes 123 and 123' formed at ends 124 and 124' of the first and second rods 121 and 122 constituting the connection member 120, and thereafter, the nut 119 is fastened thereon to complete assembling the connection member 120.

When the distance between the unit cells 111 has discrepancies, the distance between terminals 114 and 115 of two adjacent unit cells 111 becomes different from that of two through-holes 123 and 123' on the connection member 120. However, since the connection member 120 according to embodiments of the present embodiment includes two rods 121 and 122 that can relatively rotate or swing centering the coupling unit 140, the distance between the through-holes 123 and 123' can be easily adjusted. Accordingly, the connection member 120 can connect two terminals 114 and 115 regardless of a distance discrepancy between unit cells 111.

On the other hand, even if two rods 121 and 122 of connection member 120 are rotatable as aforementioned, they can entirely and uniformly maintain their junction surfaces and thereby, uniformly maintain a current flow, preventing power output of a battery from decreasing.

According to the embodiments of the present invention, since the distance between through-holes on a connection member can be adjusted to that of terminals of unit cells, it can easily cope with distance discrepancies of the unit cells. In addition, a connection member of the present invention can contribute to decreasing time and efforts taken for being mounted. Furthermore, the connection member can prevent decrease of current collecting efficiency, uniformly maintaining battery performance. Moreover, it has excellent buffering and thereby, can elastically cope with distance discrepancies between unit cells due to battery swelling.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A modular battery comprising:
   a plurality of unit cells comprising a first unit cell and a second unit cell, the first unit cell comprising a first terminal, the second unit cell comprising a second terminal; and
   a terminal connector comprising a first member and a second member, the first member being configured to be fastened to the first terminal, the second member being configured to be fastened to the second terminal, wherein the first and second member are mechanically connected with each other while being configured to rotate relative to each other about an axis.

2. The battery of claim 1, wherein the terminal connector is further configured to electrically connect the first and second terminals.

3. The battery of claim 1, wherein the terminal connector further comprises a third member rotatably interconnecting the first and second members.

4. The battery of claim 1, wherein the terminal connector further comprises means for interconnecting the first and second members and for allowing relative rotation between the first and second members about the axis.

5. The battery of claim 1, wherein the first and second unit cells are neighboring with each other without another unit cell placed therebetween.

6. The battery of claim 1, wherein the first and second member hardly rotates about the axis when fastened to the first and second terminal respectively.

7. The battery of claim 1, further comprising a plurality of additional terminal connectors, wherein each of the additional terminal connectors mechanically interconnects a terminal belonging to one of the plurality of unit cells and a terminal belonging to a another unit cell neighboring the one unit cell in the same manner as the terminal connector.

8. The battery of claim 1, wherein the unit cell is in a prismatic configuration.

9. The battery of claim 1, further comprising a separator located between the first and second unit cells.

10. The battery of claim 1, wherein the first member comprises a terminal portion engaging with the first terminal and a coupling portion engaging with the second member.

11. The battery of claim 10, wherein the first member is elongated with two opposing ends, and wherein the terminal portion is located near one end, and the coupling portion is located near the other end.

12. The battery of claim 10, wherein the coupling portion of the first member comprises a coupling hole, wherein the terminal connector further comprises a coupling member inserted into the coupling hole and engaging with the second member.

13. The battery of claim 12, wherein the axis passes through the coupling hole.

14. The battery of claim 12, wherein the second member comprises a terminal portion engaging with the second terminal and a coupling hole, and wherein the coupling member is further inserted the coupling hole of the second member.

15. The battery of claim 14, wherein the coupling member inserted through the coupling holes of the first and second member is configured to act as a shaft for the relative rotation.

16. The battery of claim 14, wherein the coupling member is a rivet.

17. The battery of claim 14, wherein the coupling member is welded to the at least one of the first and second members.

18. A method of making a modular battery, the method comprising:
   providing a plurality of unit cells comprising a first unit cell and a second unit cell, the first unit cell comprising a first terminal, the second unit cell comprising a second terminal;
   providing a terminal connector comprising a first member and a second member, wherein the first and second member are mechanically connected with each other while being configured to rotate relative to each other about an axis; and
   interconnecting the first and second terminals using the terminal connector.

19. The method of claim 18, wherein interconnecting comprises fastening the first member to the first terminal and fastening the second member to the second terminal, wherein interconnecting further comprises rotating the first member relative to the second member about the axis.

20. The method of claim 18, wherein interconnecting comprises electrically connecting the first and second terminals.

21. The method of claim 18, wherein the terminal connector further comprises means for interconnecting the first and second members and for allowing relative rotation between the first and second members.

22. The method of claim 18, wherein the first and second unit cells are neighboring with each other without another unit cell placed therebetween.

* * * * *